Dec. 27, 1949     A. D. ROBBINS     2,492,888
COLLIMATING OPTICAL SIGHT

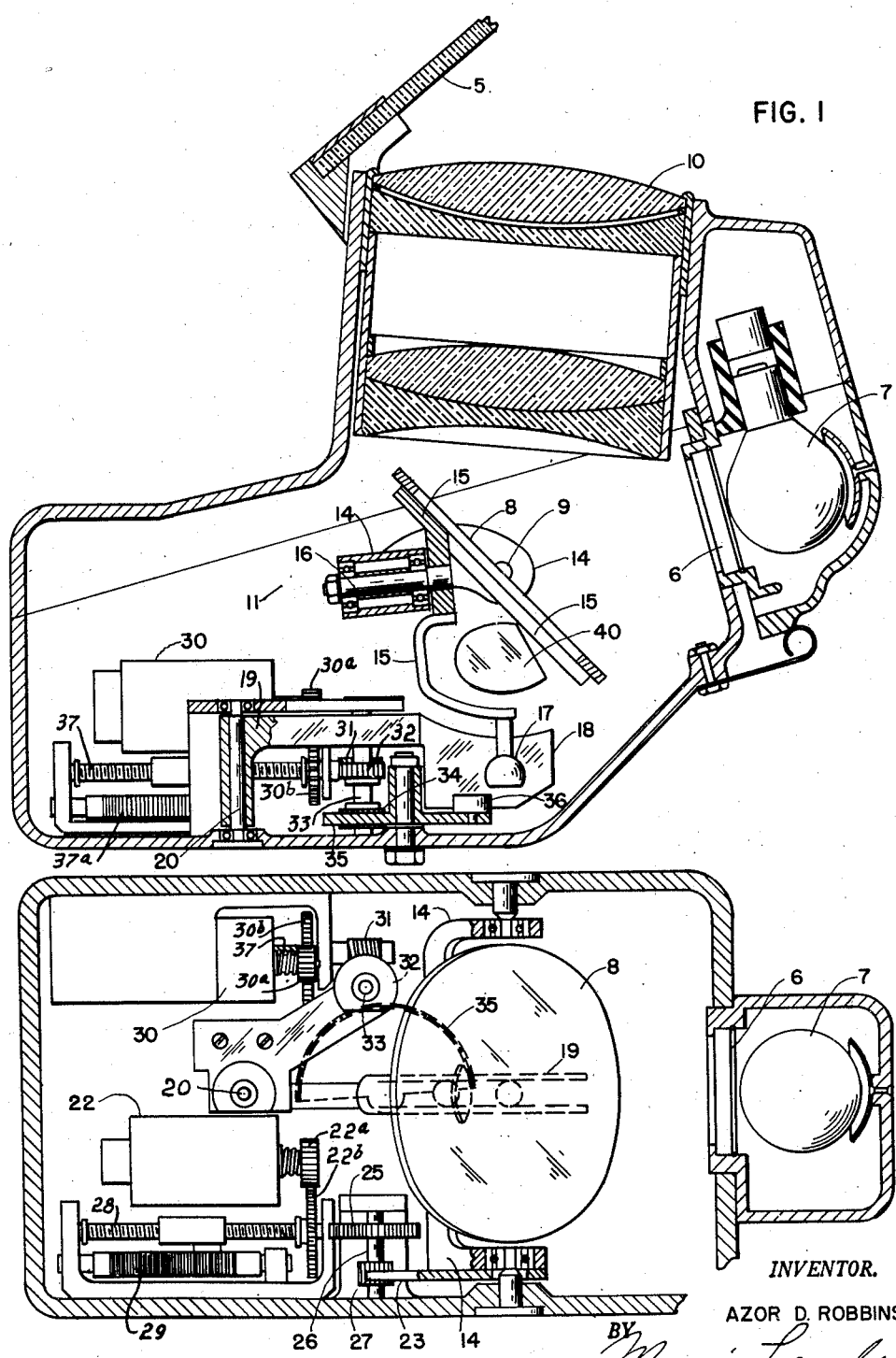

Filed Nov. 26, 1946     2 Sheets-Sheet 2

INVENTOR.
AZOR D. ROBBINS
BY

Patented Dec. 27, 1949

2,492,888

UNITED STATES PATENT OFFICE 2,492,888

COLLIMATING OPTICAL SIGHT

Azor D. Robbins, Glen Cove, N. Y., assignor to Specialties, Inc.

Application November 26, 1946, Serial No. 712,300

4 Claims. (Cl. 88—1)

The present invention relates to gun sights of a type having a combining glass through which the target is seen and in which a reticule image is reflected to indicate the line of sight to the target, and has for an object to provide an improved control for the movement of the reticule image in the combining glass.

In combat airplanes it is possible to compute the angle of lead for guns carried by an attacking plane and trained on a target plane traveling across the path of the attacking plane. The angle of lead in some cases is relatively high because of the relative movement between the attacking plane and the target plane. The present invention aims to provide a sight unit having a wide angle of movement of the line of sight as required for such combat conditions.

The invention has for an object also to provide a large field of movement and accuracy of movement of the reticule. Still another object is to provide a universal sight unit adaptable for use for various types of projectiles including rockets and the like.

Another object is to provide a movable image in which the image movement in both coordinates will be uniform throughout its travel in relation to the angular movement of the driving shafts.

Another object is to provide a relatively fixed reference reticule adjustable for bore sighting but relatively fixed as compared with the lead-indicating movable reticule image.

Another object is to provide an improved sight unit having both a fixed reticule image and a movable reticule image in the combining glass.

Another object is to provide a sight unit having a fixed and a movable reticule image arranged for separate illumination and in which particularly bright illumination of either or both images can be obtained.

The sight unit to be described for the purposes of illustration includes a combining glass with a collimating lens beneath the glass and close below the lens a universally tiltable mirror reflecting light from a fixed illuminated reticule together with a second fixed mirror reflecting light from a second illuminated reticule. Actuating means is provided for rotating the tiltable mirror about two axes at a right angle to each other in such manner as to afford a rectilinear pattern of movement of the reticule image and therefore of the line of sight.

Figure 3:
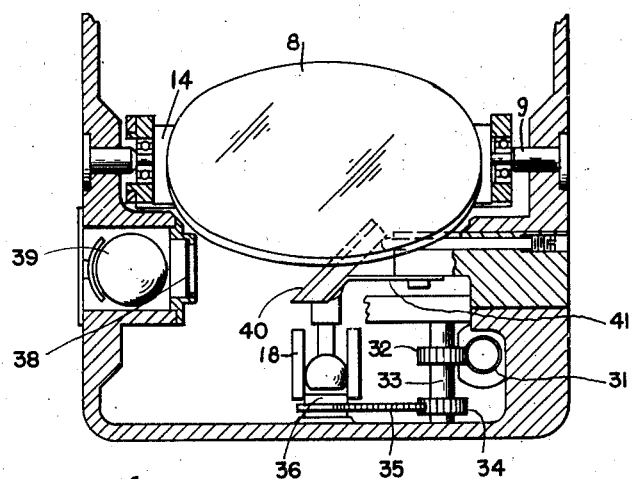
Figure 5:
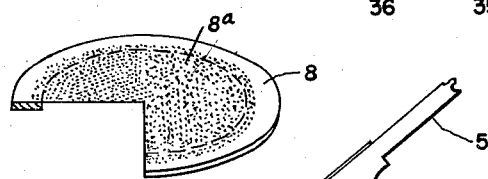
Figure 4:
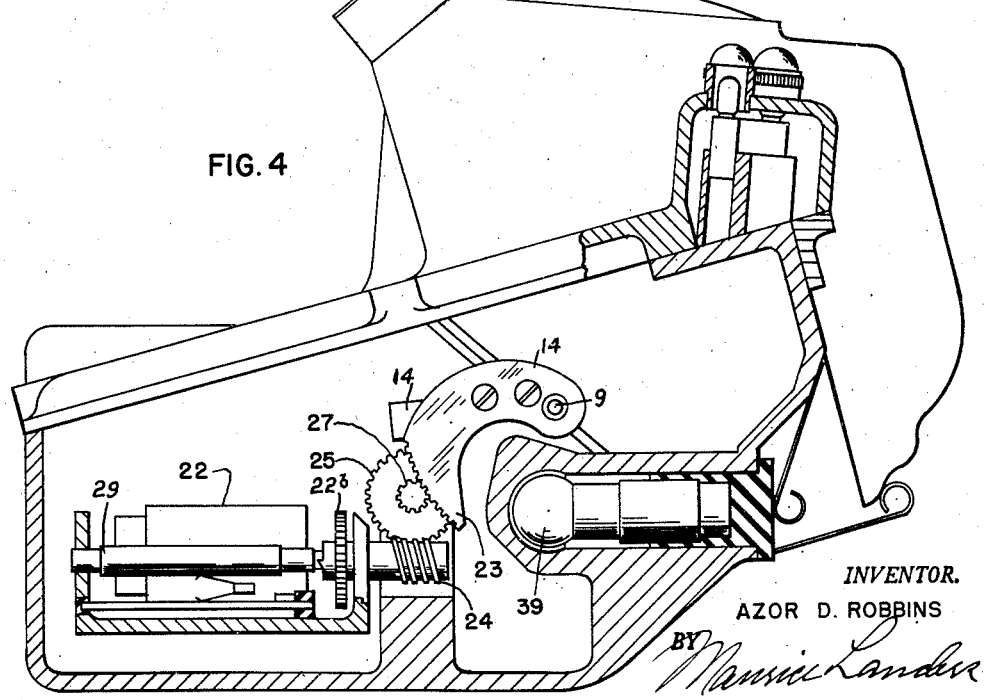

The nature and object of the invention will be better understood from a description of a particular illustrative embodiment of the invention for the purposes of which description reference should be had to the accompanying drawings forming a part hereof and in which Figure 1 is a longitudinal sectional view of a sight unit embodying the invention, Fig. 2 is a sectional plan view taken on the line 2—2 of Figure 1, Fig. 3 is a vertical sectional view taken on the line 3—3 of Fig. 4, Fig. 4 is a vertical sectional view taken on the line 4—4 of Fig. 2, and Fig. 5 is a detail view of the principal mirror.

In the sight unit shown the pilot views the target through the combining glass 5 and at the same time sees in the combining glass an image of the reticule to give him the line of sight. The reticule is shown at 6 illuminated by a lamp 7 with a mirror 8 tiltable about the axis 9 to reflect light from the reticule through the collimating lens 10 which forms an image of the reticule at infinity. The pilot sees this image reflected in the combining glass and since the image is formed at infinitive, he sees it as coincident with the target when he is flying accurately with the sight on the target. The mirror 8 is rocked about the transverse axis 9 to move the reticule image in a vertical plane thereby raising or lowering the line of sight. The mirror is tilted laterally about a substantially longitudinal axis 11 to move the image of the reticule laterally in the combining glass and thereby swing the line of sight laterally.

If the mirror 8 is moved about the axis 9 in equal arcs and about the axis 11 in equal arcs, the pattern of movement of the line of sight will be trapezoidal for the reason that when the mirror is tilted at a more acute angle to the axis of the lens lateral tilting about the axis 11 moves the image through a wider arc. This is corrected in the mechanism shown to provide a rectangular pattern of movement by causing the lateral tilting movement to be correspondingly smaller when the mirror is at a more acute angle to the axis of the collimating lens.

The mirror mounting comprises a yoke 14 pivoted for movement about the transverse axis 9 with a frame 15 in which the mirror is carried secured to a shaft 16 rotatable in a bearing in the yoke 14 on the axis 11. The depending arm of the mirror frame terminates in the ball 17 which fits between the parallel cheeks 18 of lever 19 pivoted at 20. As the lever 19 is moved laterally, the extent of lateral swing of the mirror 8 will depend upon the distance of the ball end 17 from the pivot 20 of the lever 19.

The position of the reticule 6 and lamp 7 may be varied to suit the preferences of the designer. As shown, both are so positioned that a line from the center of the reticule to the center of the principal mirror 8 makes an angle of 70° with the axis of the lens 10. The angle of shaft 16 to the plane of the mirror and the proportions of the levers 15 and 19 and other actuating parts may be selected and suitably coordinated to provide a substantially rectilinear path of movement of the reticule image. Satisfactory results have been obtained by making the angle between shaft 16 and the plane of the mirror 8 between 35° and 40° but this angle can be varied considerably if the proportions of other parts are correspondingly modified.

The movement of the mirror in the fore and aft direction and laterally is controlled by servo mechanisms, of which motors 22 and 30 provide power, responsive to computers which give the angular position of the line of sight in two coordinates and therefore determines the position of the mirror for various conditions of gravity drop, lead angle when following a moving target, and the like. The servo motor for rotating the mirror about the transverse axis 9 is indicated at 22 in Figs. 2 and 4. This motor drives a gear segment 23 secured to the yoke 14 through gearing including pinion 22$^a$, gear 22$^b$, a worm 24, worm wheel 25, shaft 26 and pinion 27. Gear 22$^c$ drives lead screw 28 which moves a contact along the potentiometer 29, forming a part of the servo control.

Servo motor 30, Figs. 1 and 2, actuates lever 19 through suitable gearing including pinion 30$^a$, gear 30$^b$, worm 31, worm wheel 32, shaft 33, pinion 34, gear segment 35, and the anti-friction roller 36 carried by the gear segment and operating between the cheeks 18 of the lever 19. Gear 30$^b$ is fixed on and drives lead screw 37 which moves a contact along potentiometer 37$^a$ forming a part of the servo control.

It is to be noted that the movement of the ball end 17 of lever 15 between the cheeks 18 of the lever 19 introduces a certain deviation from an accurate proportional movement. However, the movement of the lever 19 by the gear segment 34 is such as to provide a suitable compensation for such deviation by the following means.

Referring to Fig. 3, it can be seen that to produce uniform angular movement of lever 15 as viewed in this position, it will be necessary to displace cheeks 18 laterally in proportion to the sine of said lever angle. Roller 36 which operated as the driving means for said cheeks will displace them laterally in proportion to the sine of angular movement of segment 35. Thus, by choosing suitable lengths of lever arms it is possible to match the sine movements and establish proportionally uniform angular movements in lever 15 and gear segment 35 throughout their travel.

It is desirable for the pilot to know in which direction from the normal central bore sight position the reticule image has been moved or at what rate it is moving. For this purpose a second fixed reference reticule 38 which may be designated the "bore sight reticule" is provided. This reticule is optically on the center line of the collimating lens 10 and at the same distance from the lens along an optical axis as the reticule 6, a distance equal to the focal length of the lens, in order that the reticule image may also be focused at infinity. Conveniently, instead of actually positioning this second reticule on the axis of the lens, it may be positioned at one side as indicated in Fig. 3, and illuminated by a lamp 39. A mirror 40 is suitably positioned on the lens axis beneath the mirror 8 to reflect the image. The mirror 40 is carried by an adjustable bracket 41 in order that it may be adjusted for the purposes of bore sighting.

The two lamps 7 and 39 illuminating the respective reticules should be so chosen as to provide the desired relative brightness of the two images. Ordinarily it is preferable to have the movable image of the reticule 6 substantially brighter than the fixed reticule because this is the reticule image which the pilot maintains on the target. The desired relative brightness may also be obtained by making the reflection and transmission of light of the mirror of suitable proportions.

The mirror 8 is semi-reflecting and semi-transparent in order that light from the reticule 6 may be reflected thereby and light from the reticule 38 as reflected by mirror 40 may pass through to the collimating lens. The mirror shown is a thin transparent plastic element to which is applied a reflective coating 8$^a$ adapted to reflect and transmit substantially equal amounts of light.

The foregoing particular description is illustrative merely and is not intended as defining the limits of the invention. Various modifications and adaptations can be made without departing from the spirit of the invention as defined in the claims.

I claim:

1. In a sight unit, in combination, a casing, a combining glass, a reticule and a collimating lens fixed in the casing, a tiltable mirror positioned to reflect light from the reticule through the collimating lens to the combining glass to provide a line of sight, a supporting yoke pivoted in the casing on a transverse axis beneath the collimating lens for fore and aft tilting movement to raise and lower the line of sight, a frame carrying said mirror pivoted on said supporting yoke for lateral tilting movement to move the line of sight laterally and having a depending arm, a slotted lever pivoted in the casing for lateral movement engageable with said depending arm to move the depending arm laterally, said depending arm being movable in the slot of the slotted lever toward and from the pivot of the lever whereby the extent of lateral movement of the depending arm will vary with the position of the arm in the slot, and means for moving said slotted lever laterally.

2. In a sight unit of the character described, in combination, a casing, a combining glass, a reticule and a collimating lens beneath the combining glass fixed in the casing, a tiltable semi-transparent mirror positioned beneath the collimating lens to reflect light from the reticule through the collimating lens to the combining glass to provide a line of sight, a supporting yoke pivoted to rock on a transverse axis beneath the collimating lens, a frame in which said mirror is mounted pivoted on said yoke for lateral tilting movement, the axis of the pivot of said frame lying at an angle of between 35° and 45° to the plane of the mirror, a second mirror positioned beneath the semi-transparent mirror, and a second reticule positioned to be reflected by said second mirror along the axis of the collimating lens to the combining glass to provide a second line of sight.

3. A sight unit according to claim 1, in which there is mounted within the casing an electric motor actuated by remote control to drive gearing to rotate said supporting yoke about said transverse axis, and a second electric motor also actuated by remote control to drive gearing to move said slotted lever laterally.

4. In a collimating optical sight, in combination, a casing; a combining glass external of said casing; a collimating lens fixed in said casing; a first reticule illuminated by a first source of light; a semi-transparent, semi-reflecting mirror positioned to reflect the image of said first reticule through said collimating lens onto said combining glass to establish a first line of sight; a support for said mirror pivoted in the casing for movement on a transverse axis and for movement laterally at a right angle to said transverse axis to cause said first reticule to move on said combining glass both horizontally and vertically; a second reticule illuminated by a second source of light, positioned in fixed position beyond said mirror and visible coaxial with said collimating lens through said mirror on said combining glass to establish a fixed second line of sight; a first servomechanism within said casing acting upon receipt of a signal to tilt said mirror support on its transverse axis; and a second servomechanism within said casing acting upon receipt of a signal to tilt said mirror support on laterally.

AZOR D. ROBBINS.

REFERENCES CITED

The following references are of record in the file of this patent:

UNITED STATES PATENTS

| Number | Name | Date |
|---|---|---|
| 1,783,769 | Bates | Dec. 2, 1930 |
| 2,162,698 | Chaffee et al. | June 20, 1939 |
| 2,322,395 | Sheppard | June 22, 1943 |
| 2,368,959 | Winslow | Feb. 6, 1945 |
| 2,379,894 | Esval et al. | July 10, 1945 |
| 2,409,648 | Auken et al. | Oct. 22, 1946 |
| 2,428,870 | Essex | Oct. 14, 1947 |
| 2,434,109 | Harasta | Jan. 6, 1948 |

FOREIGN PATENTS

| Number | Country | Date |
|---|---|---|
| 776,640 | France | Nov. 8, 1934 |
| 837,661 | France | Nov. 18, 1938 |